US012607236B2

(12) United States Patent
Klein et al.

(10) Patent No.: US 12,607,236 B2
(45) Date of Patent: Apr. 21, 2026

(54) ACTUATION DEVICE FOR A TRANSMISSION SYSTEM

(71) Applicant: VALEO EMBRAYAGES, Amiens Cedex (FR)

(72) Inventors: Vincent Klein, Amiens (FR); Fabien Diascorn, Amiens (FR); Nicola Savastano, Mondovi (IT); Laurent Caumartin, Amiens (FR); Christophe Mollier, Amiens (FR)

(73) Assignee: VALEO EMBRAYAGES, Amiens Cedex (FR)

( * ) Notice: Subject to any disclaimer, the term of this patent is extended or adjusted under 35 U.S.C. 154(b) by 0 days.

(21) Appl. No.: 18/948,960

(22) Filed: Nov. 15, 2024

(65) Prior Publication Data

US 2025/0154990 A1 May 15, 2025

(30) Foreign Application Priority Data

Nov. 15, 2023 (FR) ...................................... 2312524

(51) Int. Cl.
| | |
|---|---|
| *F16D 28/00* | (2006.01) |
| *B60K 17/02* | (2006.01) |
(Continued)

(52) U.S. Cl.
CPC .............. *F16D 28/00* (2013.01); *B60K 17/02* (2013.01); *F16D 11/14* (2013.01); *F16H 48/08* (2013.01); *F16H 48/40* (2013.01); *F16H 57/02* (2013.01); *F16H 57/037* (2013.01); *F16D 2125/28* (2013.01); *F16D 2300/12* (2013.01); *F16D 2500/10425* (2013.01);
(Continued)

(58) Field of Classification Search
CPC ................................................ F16D 2023/141
See application file for complete search history.

(56) References Cited

U.S. PATENT DOCUMENTS

| | | | |
|---|---|---|---|
| 2,236,355 A | 3/1941 | Russell | |
| 4,903,808 A * | 2/1990 | Okubo | F16D 23/12 74/606 R |
(Continued)

FOREIGN PATENT DOCUMENTS

WO     WO 2021/115374 A1     6/2021

OTHER PUBLICATIONS

Extended European Search Report issued Mar. 13, 2025, in corresponding European Patent Application No. 24210639.1, 5 pages.
(Continued)

*Primary Examiner* — Stacey A Fluhart
(74) *Attorney, Agent, or Firm* — Oblon, McClelland, Maier & Neustadt, L.L.P.

(57) ABSTRACT

An actuation device for a transmission system includes an electric motor capable of being fastened to an actuation housing, and a speed reduction device kinematically linked to the rotor of the electric motor and an output shaft of the speed reduction device having a first axis of rotation. An actuation fork is rigidly connected to the output shaft of the speed reduction device for rotation therewith and includes an actuation end that is radially offset relative to the first axis of rotation. The actuation fork is capable of pivoting through a first angular sector in the actuation housing.

26 Claims, 9 Drawing Sheets

(51) Int. Cl.

| | | |
|---|---|---|
| *F16D 11/14* | (2006.01) | |
| *F16H 48/08* | (2006.01) | |
| *F16H 48/40* | (2012.01) | |
| *F16H 57/02* | (2012.01) | |
| *F16H 57/037* | (2012.01) | |
| *F16D 125/28* | (2012.01) | |

(52) U.S. Cl.

CPC .............. *F16D 2500/10462* (2013.01); *F16D 2500/1107* (2013.01); *F16H 2057/02026* (2013.01); *F16H 2057/02034* (2013.01); *F16H 2057/02052* (2013.01); *F16H 2057/02082* (2013.01)

(56) References Cited

U.S. PATENT DOCUMENTS

| | | | |
|---|---|---|---|
| 11,976,692 B1 * | 5/2024 | Lee | F16D 23/12 |
| 2009/0229392 A1 * | 9/2009 | Kim | F16D 23/12 |
| | | | 74/318 |
| 2010/0144478 A1 | 6/2010 | Fan | |
| 2017/0159723 A1 * | 6/2017 | Lv | F16D 23/12 |
| 2019/0152316 A1 * | 5/2019 | Wentz | B60K 17/344 |
| 2024/0209938 A1 * | 6/2024 | Cyrén | F16H 63/304 |

OTHER PUBLICATIONS

European Office Action issued Mar. 25, 2025, in corresponding European Patent Application No. 24 210 639.1, 6 pages.

* cited by examiner

Fig. 8

ACTUATION DEVICE FOR A TRANSMISSION SYSTEM

The present invention relates to the field of actuation devices for transmission systems.

The actuation device is for example inserted into a speed reducer transmission system comprising at its output a differential intended to transmit and distribute torque originating from a rotary electric machine to two half-shafts of an axle of a motor vehicle. The differential may contain a disconnection device interposed between the output of the speed reducer and the wheel of the vehicle in order to disconnect the transmission system from the wheels of the vehicle. This disconnection may be beneficial in terms of energy efficiency when it is not necessary to supply torque to the wheels of the vehicle.

WO21115374 A1 discloses a differential transmission system comprising a differential casing that is rotatable about a first axis and provided with a toothed wheel driven by a power unit of the vehicle. Housed inside the casing are a supporting ring guided in rotation in the casing, two planet pinions rotatably mounted on the supporting ring about a second axis perpendicular to the first axis, and two sun gears, each of which meshes with the two planet pinions and each of which is rigidly connected to a half-shaft for rotation therewith. Used on a motor vehicle, the differential transmission system makes it possible for the driving wheels to rotate a different speeds on a bend: the wheels situated on the outside of the bend rotate more quickly than those situated on the inside.

In addition, the differential comprises a disconnection device that makes it possible to either couple the casing of the differential to the supporting ring so as to transmit and distribute the torque from the power unit to the two half-shafts of the axle, or uncouple them so as to interrupt the transmission of torque between the power unit and the half-shafts. The disconnection device is controlled by an actuation fork controlled by an electric motor; the electric motor generates an axial movement of the fork in a direction parallel to the first axis of the differential casing. The disconnection device is a claw-type device. Such a disconnection device is not entirely satisfactory, as the speed of movement of the end of the actuation fork is low. The actuation time for reaching the two coupled and uncoupled positions of the disconnection device is long. Additionally, the conversion of the rotation of the electric motor into axial movement of the fork requires the use of a ball screw, which is an extremely costly mechanical device for ensuring satisfactory reliability throughout the service life of the vehicle. The assembly of such a disconnection device on a transmission system differential may also be complex.

The present invention aims to overcome these drawbacks by proposing an actuation device having a shorter actuation time for reaching the two coupled and uncoupled positions of the disconnection device and the assembly of which on the transmission system is simplified.

The main object of the present invention is thus an actuation device for a transmission system, comprising:

- an electric motor capable of being fastened to an actuation housing;
- a speed reduction device kinematically linked to the rotor of the electric motor and an output shaft of the speed reduction device having a first axis of rotation;
- an actuation fork rigidly connected to the output shaft of the speed reduction device for rotation therewith and comprising an actuation end that is radially offset relative to the first axis of rotation, the actuation fork being capable of pivoting through a first angular sector in the actuation housing, wherein the actuation fork is capable of adopting a mounting end angular position corresponding to one of the limits of the first angular sector and wherein the actuation fork is capable of adopting an operating angular position different from the mounting end angular position, the operating angular position being variable in a second angular sector contained in the first angular sector.

Due to the radial offset of the actuation end relative to the first axis of rotation, despite a smaller angular displacement of the actuation fork in the second angular sector, it is possible to have a large axial displacement of the actuation end of the fork. The lever arm thus created makes it possible to increase the speed of movement of the end of the actuation fork, which results in a reduction in the actuation time of the disconnection device.

The angle value of the first angular sector may be between 5° and 120°.

The angle value of the second angular sector may be between 1° and 30°.

Preferably, the mounting end angular position of the actuation fork is capable of being obtained by mechanically abutting the actuation housing and a component selected from the actuation fork, the speed reduction device and the output shaft. The accuracy of the positioning of the actuation fork during the phase of mounting on the transmission system is thus improved.

Advantageously, the actuation fork may comprise a body and at least one actuation arm supporting the actuation end, in particular two actuation arms, the at least one actuation arm being integrally formed with the body of the fork.

Advantageously, the actuation end may be a pad articulated on the end of the actuation arm or a ball bearing the non-rotating ring of which is fastened to the actuation arm.

According to one embodiment of the invention, the mounting end angular position of the actuation fork is capable of being obtained by mechanically abutting the actuation housing and a protrusion formed on the actuation fork. The accuracy of the positioning of the actuation fork during the phase of mounting on the transmission system is thus further improved.

Preferably, the actuation fork may comprise a body and at least one actuation arm supporting the actuation end, in particular two actuation arms, the protrusion and the at least one actuation arm being angularly offset relative to the first axis of rotation.

According to one example, the at least one actuation arm and the protrusion are offset by an angle of 180° relative to the first axis of rotation.

According to another example, the at least one actuation arm and the protrusion are offset by an angle of 120° relative to the first axis of rotation.

Advantageously, the protrusion of the actuation fork is capable of bearing on a flat face of the actuation housing.

According to one embodiment of the invention, the mounting end angular position of the actuation fork is capable of being obtained by mechanically abutting the actuation housing and a protrusion formed on one of the pinion or toothed sector of the speed reduction device.

Preferably, the pinion supporting the protrusion comprises teeth extending over a third angular sector of between 20° and 150°.

Advantageously, the protrusion of the pinion is capable of bearing on a flat face of the actuation housing.

According to another embodiment of the invention, the mounting end angular position of the actuation fork is capable of being obtained by mechanically abutting the actuation housing and a pin fitted into the output shaft, the pin being fitted perpendicular to the first axis of rotation.

Advantageously, the fitted pin is capable of bearing on a flat face of the actuation housing.

According to another aspect thereof, the invention also relates to an actuation module comprising an actuation housing and an actuation device having all or some of the aforementioned features, the actuation housing and the actuation device being pre-mounted so as to form a unitary assembly, and wherein the actuation end of the actuation fork is protruding relative to the actuation housing.

Due to the pre-mounting in order to form a unitary assembly, this actuation module according to the invention offers the advantage of avoiding an additional mounting step during the assembly of the transmission system in the factory, which avoids disrupting the production line of the vehicle manufacturer. The actuation module may be functionally tested by the manufacturer of the module and not by the vehicle manufacturer.

Because the actuation end of the actuation fork extends so that it protrudes from the actuation housing, the actuation module may be mounted with little or a complete lack of visibility of the inside of the transmission housing.

According to this aspect of the invention, the actuation module comprises an actuation housing and an actuation device for a transmission system, the actuation device comprising:

an electric motor capable of being fastened to an actuation housing;

a speed reduction device kinematically linked to the rotor of the electric motor and an output shaft of the speed reduction device having a first axis of rotation;

an actuation fork rigidly connected to the output shaft of the speed reduction device for rotation therewith and comprising an actuation end that is radially offset relative to the first axis of rotation, the actuation fork being capable of pivoting through a first angular sector in the actuation housing, wherein the actuation fork is capable of adopting a mounting end angular position corresponding to one of the limits of the first angular sector and wherein the actuation fork is capable of adopting an operating angular position different from the mounting end angular position, the operating angular position being variable in a second angular sector contained in the first angular sector.

and wherein the actuation housing and the actuation device are pre-mounted so as to form a unitary assembly, and wherein the actuation end of the actuation fork is protruding relative to the actuation housing.

Advantageously, a removable locking element may be inserted into an orifice of the actuation housing and immobilize the actuation fork in the mounting end angular position until the actuation module is assembled on the transmission system. After assembly, the locking element is removed from the actuation housing to release the actuation fork.

The actuation module according to the invention may have one or other of the features described below, in combination with each other or taken independently of each other:

the actuation housing comprises a flat face arranged to be in contact with a component selected from the actuation fork, the speed reduction device and the output shaft when the actuation fork is in the mounting end angular position;

the flat face of the actuation housing is either as cast or machined;

the actuation housing comprises a bottom and two parallel walls integrally formed with the bottom, the two walls acting as a support for the output shaft;

the actuation housing supports a sensor for sensing the position of the actuation fork, the detection face of the position sensor being positioned facing at least one actuation arm of the actuation fork;

the electric motor is attached to an external wall of the actuation housing;

the electric motor is housed in the internal volume of the actuation housing;

the flat face for contact with the protrusion is positioned in the bottom of the housing;

the flat face for contact with the protrusion is positioned on one of the edges of the housing;

the actuation housing comprises a fastening base, and the actuation end of the actuation fork extends beyond the fastening base of the actuation housing.

According to another aspect thereof, the invention also relates to a transmission system comprising:

a transmission housing;

a transmission shaft comprising a device for disconnecting the transmission of torque, the transmission shaft being inserted into an orifice of the transmission housing;

an actuation module having all or some of the aforementioned features, wherein the actuation fork passes through an opening made in the transmission housing and the actuation end is inserted into an annular groove of the disconnection device.

This transmission system makes it possible to ensure the correct placement of the actuation fork relative to the disconnection device of the transmission shaft at the end of assembly despite the little or complete lack of visibility of the inside of the transmission housing.

Preferably, the transmission shaft is a differential comprising a differential casing supporting a toothed wheel and a supporting ring, the casing and the supporting ring being rotatable relative to each other about a main axis X, the casing being intended to be driven by a rotary electric machine and the supporting ring being intended to drive at least one half-shaft of the motor vehicle.

Advantageously, the disconnection device comprises a first coupling part rigidly connected to the casing for rotation therewith and a second coupling part rigidly connected to the supporting ring for rotation therewith, the first coupling part being axially movable relative to the casing between a coupled position in which the first coupling part is coupled to the supporting ring so as to transmit torque between the casing and the supporting ring, and an uncoupled position in which the first coupling part and the second coupling part are uncoupled from each other, and the first coupling part supports an annular axial sliding sleeve that comprises the annular groove of the disconnection device.

Preferably, the actuation end may be inserted into an annular groove of the disconnection device, more specifically into an annular groove formed in an axial sliding sleeve that is attached to the first coupling part.

Advantageously, the axial sliding sleeve may have a shape exhibiting symmetry of revolution and comprise a bearing flange and a mating flange, said bearing flange and said mating flange surrounding the annular groove.

Preferably, the external diameter of the mating flange may be greater than the external diameter of the bearing flange. This difference in diameter makes it possible to ensure the correct placement of the actuation fork relative to the disconnection device of the transmission shaft at the end of assembly despite the little or complete lack of visibility of the inside of the transmission housing.

According to another aspect thereof, the invention also relates to a method for assembling a transmission system having all or some of the aforementioned features, comprising the following steps:

inserting the transmission shaft into an orifice of the transmission housing until the transmission shaft abuts axially on the transmission housing along the direction of the main axis X of the orifice;

inserting the actuation fork into the opening of the transmission housing and fitting an actuation end of the actuation fork into the annular groove of the disconnection device;

bringing the actuation device towards the transmission housing in a direction perpendicular to the main axis X of the orifice of the transmission housing until the actuation housing of the actuation module bears on the transmission housing;

fastening the actuation module to the transmission housing with fastening screws.

Due in particular to the protrusion of the actuation end of the actuation fork relative to the actuation housing, this assembly method makes it possible to assemble the actuation module on the transmission system despite the little or complete lack of visibility of the inside of the transmission housing.

The actuation module may also be assembled independently of the rest of the components of the transmission system, which may facilitate maintenance in the event of the failure of the electric motor or the position sensor of the actuation module.

According to another aspect thereof, the invention also relates to a transmission system comprising:

a transmission housing;

a transmission shaft comprising a device for disconnecting the transmission of torque, the transmission shaft being inserted into an orifice of the transmission housing;

an actuation device having all or some of the aforementioned features, wherein the actuation fork is housed in the transmission housing and the actuation fork is inserted into an annular groove of the disconnection device;

the transmission housing serves as the actuation housing, the transmission housing and the actuation device are pre-mounted so as to form a unitary assembly.

This transmission system makes it possible to ensure the correct placement of the actuation fork relative to the disconnection device of the transmission shaft at the end of assembly despite the complete lack of visibility of the inside of the transmission housing. Due to this architecture of the transmission system, in which the transmission housing serves directly as the actuation housing, it is possible to blindly fit the actuation end of the actuation fork into the annular groove of the disconnection device during the movement of the transmission shaft along the direction of the main axis X of the orifice.

According to another aspect thereof, the invention also relates to a transmission system comprising:

a transmission housing;

a drive transmission shaft comprising a first external spline, the drive transmission shaft being inserted into an orifice of the transmission housing;

a driven transmission shaft coaxial with the drive shaft, comprising a second external spline;

an axial sliding sleeve concentric with the driven and drive shafts having a shape exhibiting symmetry of revolution, the axial sliding sleeve comprising at least a first internal connecting spline arranged to rotate the drive shaft and a second internal connecting spline arranged to rotate the driven shaft, the first and second internal splines being engaged respectively in the first external spline of the drive shaft and the second external spline of the driven shaft when the axial sliding sleeve is in a coupled end position;

an actuation module having all or some of the aforementioned features, wherein the actuation fork passes through an opening made in the transmission housing and the actuation fork is inserted into an annular groove of the axial sliding sleeve.

This transmission system architecture is compact and suitable for any incorporation into a speed reducer of an electric vehicle to disconnect the transmission of the torque originating from the drive shaft, for example the output shaft of a speed reducer, to the driven shaft, for example the wheel of a vehicle. When the reversible electric machine associated with the speed reducer is inactive, there is no benefit in leaving said machine connected to the wheel of the vehicle.

This transmission system makes it possible to ensure the correct placement of the actuation fork relative to the axial sliding sleeve at the end of assembly despite the little or complete lack of visibility of the inside of the transmission housing.

Advantageously, the second internal connecting spline of the axial sliding sleeve may be made in the form of a series of internal splines axially spaced apart at a uniform pitch, for example five internal splines axially spaced apart at a pitch of between 3 and 15 mm.

Preferably, the second internal spline may be disengaged from the second external spline of the driven shaft when the axial sliding sleeve is in another uncoupled end position.

The invention further relates to a hybrid or electric motor vehicle comprising a transmission system as set out above.

Further features, details and advantages of the invention will become more clearly apparent from reading the following description, and from studying exemplary embodiments given by way of non-limiting illustration, with reference to the appended drawings, in which:

FIG. 8 is a perspective view of an actuation module provided with its actuation device according to a fourth embodiment of the invention;

The features, variants and different embodiments of the invention may be associated with one another in various combinations, provided that they are not mutually incompatible or mutually exclusive.

In the figures, elements common to several figures have the same reference sign.

In the description and the claims, the terms "external" and "internal" and the orientations "axial" and "radial" will be used to denote elements of the transmission system according to the definitions given in the description. By convention, the "radial" orientation is orthogonal to the main axis of rotation X of the transmission system determining the "axial" orientation and, from the inside to the outside moving away from said axis, the "circumferential" orientation is orthogonal to the main axis X and orthogonal to the radial direction.

FIGS. 1 to 5 illustrate a speed reducer transmission system 1, comprising an actuation module and an actuation device according to a first embodiment. Such a transmission system may, for example, form part of a secondary transmission line capable of transmitting torque from a secondary power unit of the vehicle, such as a rotary electric motor, to a rear or front axle of a vehicle, while a primary transmission line is capable of transmitting torque from a main power unit, for example an internal combustion engine, to the half-shafts of another axle of the vehicle.

The speed reducer may use a coaxial architecture comprising a planetary gear set or a parallel transmission shaft architecture. At the output of the speed reducer, the transmission shaft is a differential that is used to transmit and distribute torque originating from a rotary electric machine, not illustrated, to two half-shafts 2, 3 of an axle of a motor vehicle. When the rotary electric machine associated with the speed reducer is inactive, there is no benefit in leaving said machine connected to the wheel of the vehicle. A disconnection device 110, which is for example incorporated into the differential, is then disengaged.

Figure 4:
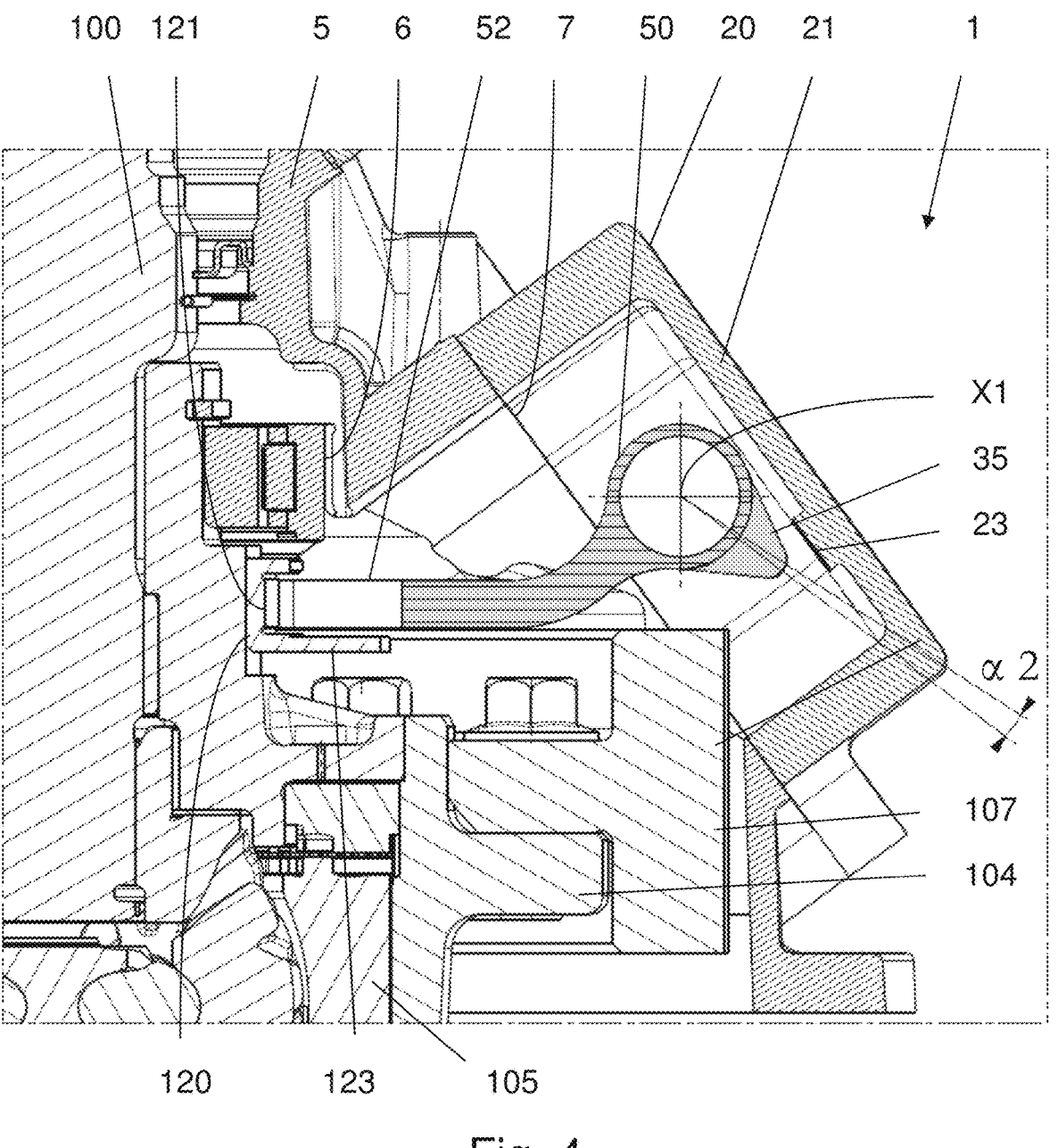
FIG. 4 is a cross-sectional view showing the actuation module according to the first embodiment in FIG. 1 assembled on the transmission system.
Figure 5:
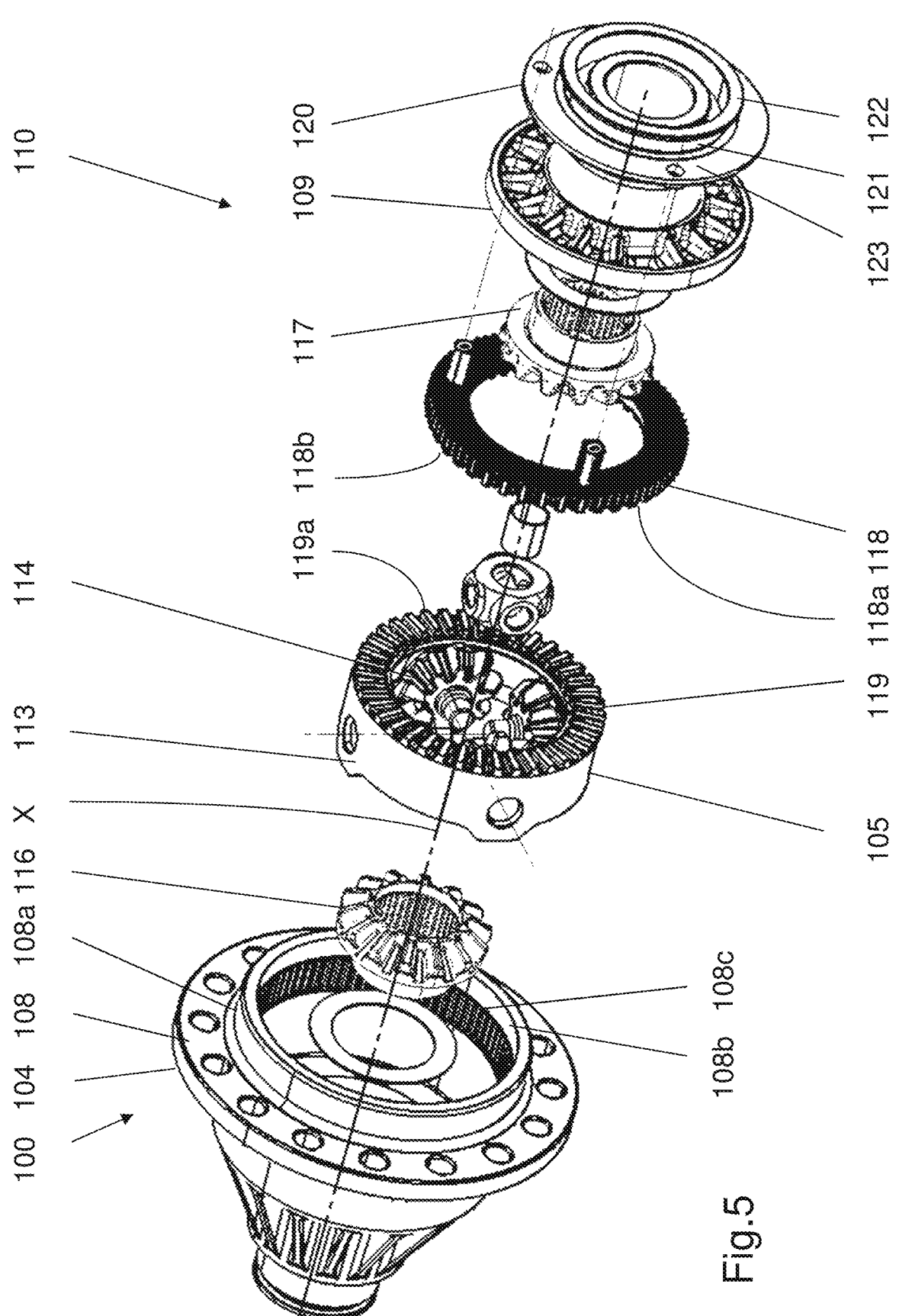
FIG. 5 is an exploded perspective view of the disconnection device included in the transmission system in FIG. 2.

As illustrated in FIGS. 4 and 5, the transmission system 1 according to the first embodiment comprises a transmission housing 5 and at least one transmission shaft 100 inserted into an orifice 6 of the transmission housing.

The transmission shaft produced in the form of a differential 100 comprises a first element 104, rotatable about a main axis X, and intended to be driven by a motor, such as an electric machine which is not shown, a second element 105, also rotatable about the main axis X and intended to drive the half-shafts 2, 3, and a disconnection device 110 capable of selectively coupling or uncoupling the first element 104 and the second element 105.

The first element 104 comprises a toothed wheel 107 that is intended to be driven by the electric machine via a reduction gear set which is not shown. This first element 104 also comprises a casing 108 that is rigidly connected to the toothed wheel 107 for rotation therewith. Here, the casing 108 is illustrated in one piece, but it could be made up of several parts fastened together.

The second element 105 comprises an annular supporting ring 113 that is guided in rotation about the main axis X inside the casing 108. To this end, the casing 108 comprises an internal cylindrical portion collaborating with a cylindrical external surface of the supporting ring 113 in order to guide it in rotation relative to the casing 108. The second element 105 further comprises four planet pinions 114 which are shown in FIG. 4 and are rotatably mounted on the supporting ring 113 about a secondary axis Z perpendicular to the main axis X. The four planet pinions 114 each comprise bevel gear teeth that mesh with complementary bevel gear teeth of two sun gears 116, 117. The two sun gears 116, 117 are rotatable about the main axis X and are each rigidly connected to one of the two half-shafts 2, 3 for rotation therewith. The supporting ring 113, the planet pinions 114 and the sun gears 116, 117 form a differential 100 allowing the two half-shafts 2, 3 to rotate at different speeds.

In addition, the differential 100 comprises a disconnection device 110 which, in the coupled position, allows torque to be transmitted between the first element 104 and one of the components of the second element 105, here the supporting ring 113. When the disconnection device 110 is in the coupled position, the transmission system thus allows torque to be transmitted from the motor to the half-shafts 2, 3, acting as a differential allowing different rotation speeds of the half-shafts 2, 3.

The disconnection device 110 is actuated using an actuation device 30 to pass quickly from the coupled position to the uncoupled position. In this first embodiment, the actuation device 30 is outside the differential 100, and for reasons of ease of mounting, it is attached to an actuation module 20. The actuation module 20 comprises in particular an actuation housing 21 and the actuation device 30, the actuation housing and the actuation device being pre-mounted so as to form a unitary assembly.

As illustrated in FIG. 5, the disconnection device 110 comprises a first coupling part 118 that is rigidly connected to the casing 108 for rotation therewith while being axially movable along the main axis X relative to said casing 108. The first coupling part 118 movable between an uncoupled position, shown in FIG. 4, and a coupled position. In the uncoupled position, the first coupling part 118 is uncoupled from a second coupling part 119 that is rigidly connected to the supporting ring 113 for rotation therewith, so that the transmission of torque between the casing 108 and the supporting ring 113 is interrupted. By contrast, in the coupled position, the first coupling part 118 is coupled to the second coupling part 119, which allows the transmission of torque between the casing 108 and the supporting ring 113.

In the embodiment shown, the disconnection device 110 is a claw-type device. One of the first and second coupling parts 118, 119 thus comprises teeth while the other comprises corresponding slots in which said teeth engage when the first coupling part 118 is in the coupled position. In the embodiment shown, the second coupling part 119 is integrally formed with the supporting ring 113. In other words, teeth or slots are formed in the lateral face of the supporting ring 113 that faces towards the first coupling part 118.

As shown in FIG. 5, the first coupling part 118 is an annular component comprising:

first teeth 118a oriented radially relative to the main axis X and arranged to mesh with the first element 104; and second teeth 118b oriented axially and arranged to mesh with the second coupling part 119, the radially-oriented first teeth and the axially-oriented second teeth forming the annular part of the component. This makes it possible to rigidly connect the first coupling part 118 to the casing 108 for rotation therewith while allowing relative axial movement between the first coupling part 118 and the casing 108.

The casing 108 forms a cavity 108b arranged to receive a gear set and supports the torque transmission toothed wheel 107 on its external periphery 108a. At the entrance of the cavity 108b, the casing 108 supports an internal spline 108c arranged to mesh with the radially-oriented first teeth 118a of the first coupling part 118. The internal spline 108c is for example a straight spline having geometry that complements the geometry of the radially-oriented first teeth 118a. As a variant, the internal spline 108c may be a series of recesses capable of receiving the radially-oriented first teeth 118a.

Additionally, the second coupling part 119 comprises axially-oriented additional teeth 119a arranged to mesh with the axially-oriented second teeth 118b of the first coupling part 118 when the first coupling part 118 is in the coupled position. The axially-oriented additional teeth 119a are for example a series of slots having geometry that complements the geometry of the axially-oriented second teeth 118b. The axially-oriented additional teeth 119a may comprise teeth or slots made on the lateral face of the supporting ring 113 perpendicular to the main axis X.

In this first embodiment of the invention, the radially-oriented first teeth 118a and the axially-oriented second teeth 118b are contiguous. As there is the same number of first teeth 118a and the second teeth 118b, it is possible for the radially-oriented first teeth 118a to be aligned with the axially-oriented second teeth 118b, so that the bottom of the first set of teeth communicates directly with the bottom of the second set of teeth. This makes the teeth easier to obtain by machining.

Figure 1:
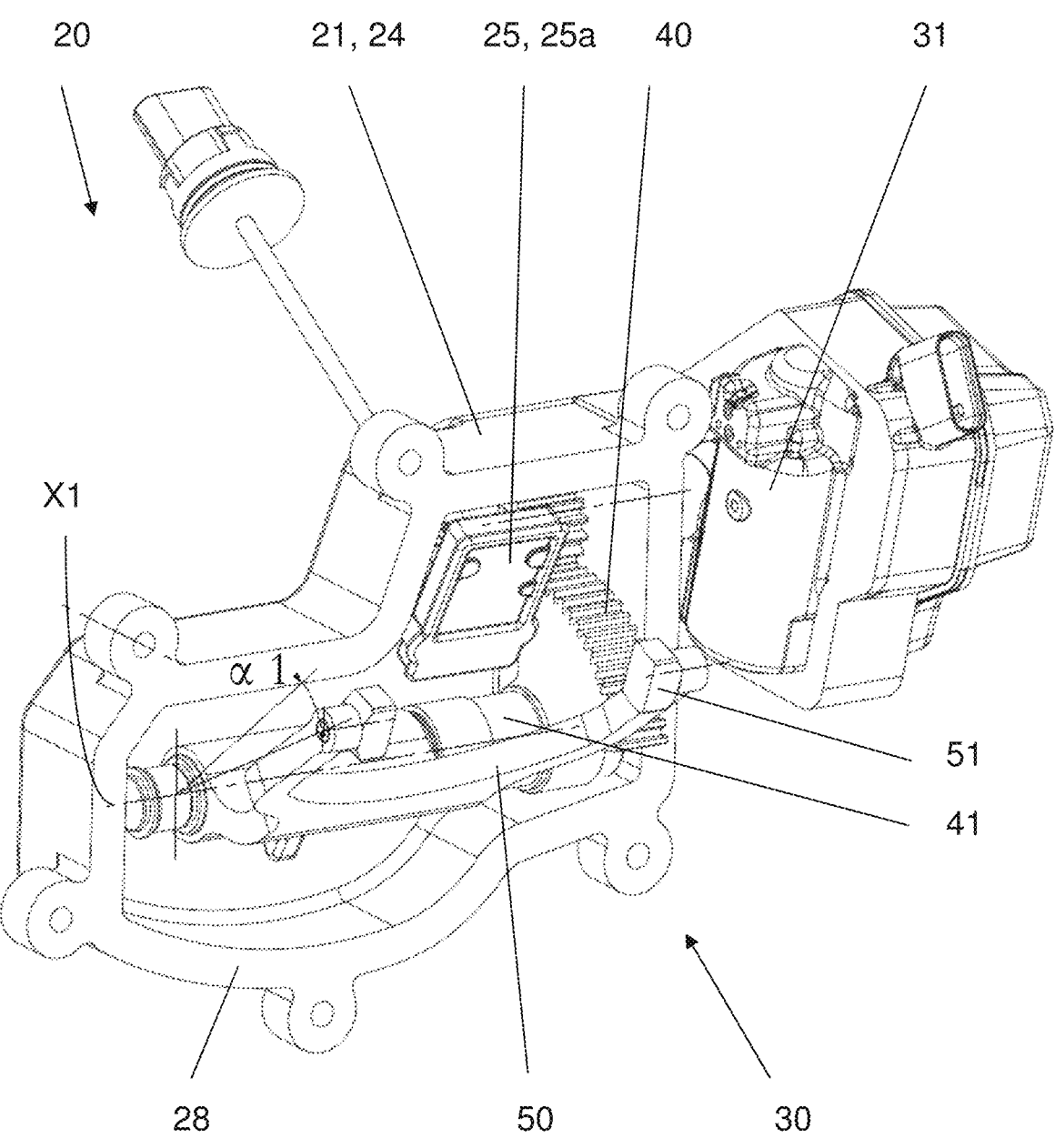
FIG. 1 is an isometric view of a module provided with its actuation device according to a first embodiment of the invention.

As seen above, the transmission system 1 comprises an actuation device 30 of the disconnection device 110, illustrated in greater detail in FIG. 1, making it possible to move the first coupling part 118 axially.

The actuation device 30 comprises:

an electric motor 31 fastened to the actuation housing 21;

a speed reduction device 40 kinematically linked to the rotor of the electric motor 31 and an output shaft 41 of the speed reduction device having a first axis of rotation X1;

an actuation fork 50 rigidly connected to the output shaft 41 of the speed reduction device for rotation therewith and comprising an actuation end 51 that is radially offset relative to the first axis of rotation X1.

The actuation fork 50 pivots through a first angular sector α1 in the actuation housing 21. The angle value of the first angular sector α1 is between 5° and 120°.

This first angular sector α1 allows the actuation fork 50 to adopt all of the positions necessary, from the phase of assembly of the actuation module 20 on the transmission housing to the operating phases in which the disconnection device 110 is in the coupled position or the uncoupled position.

The actuation housing 21 comprises a bottom 22 and two parallel walls 23 integrally formed with the bottom, the two walls 23 acting as a support for the output shaft 41 of the speed reduction device 40. The electric motor 31 is attached to the external wall 24 of the actuation housing 21.

The actuation housing 21 also comprises a fastening base 28, and the actuation end 51 of the actuation fork extends beyond the fastening base 28 of the actuation housing.

The actuation fork 50 comprises a body 53 and two actuation arms 52 supporting the actuation end 51, the two actuation arms 52 being integrally formed with the body of the fork. The body 53 is housed in the actuation housing 21 while the two actuation arms 52 extend beyond the actuation housing 21.

In this first embodiment, the actuation end 51 is a pad articulated on the end of the actuation arm 52. The end 51 is inserted into an annular groove 121 of the disconnection device, more specifically into an annular groove 121 formed in an axial sliding sleeve 120 that is attached to the first coupling part 118.

The axial sliding sleeve 120 serves as the interface between the actuation fork 50 and the disconnection device 110. The axial sliding sleeve 120 has a shape exhibiting symmetry of revolution and comprises a bearing flange 122 and a mating flange 123. The bearing flange 122 and the mating flange 123 surround the annular groove 121. The external diameter of the mating flange 123 is greater than the external diameter of the bearing flange 122.

The axial sliding sleeve 120 is fastened to the first coupling part 118 using fastening screws.

As illustrated in FIG. 5, a differential cover 109 is interposed axially between the axial sliding sleeve 120 and the first coupling part 118. The differential cover 109 is rigidly connected to the differential casing 108. The motor torque originating from the toothed wheel 107 is transmitted to the first coupling part 118 by means of spacers that pass through the differential cover 109. Relative axial movement is possible between the axial sliding sleeve 120 and the differential cover 109.

In order to allow the axial movement of the first coupling part 118 of the disconnection device 110, the actuation fork 50 moves angularly through a second angular sector α2. In the coupled position, the actuation end 51 bears on the mating flange 123. In the uncoupled position, the actuation end 51 bears on the bearing flange 122.

The operating angular position varies depending on an angle value of the second angular sector α2, which is for example between 1° and 30°. The second angular sector α2 is in particular contained in the first angular sector α1. The angle value of the second angular sector α2 is therefore strictly less than the angle value of the first angular sector α1 so that the operating angular position is different from the mounting end angular position. This makes it possible to allow for all of the dimensional tolerances of the components forming the transmission system and the actuation module.

In order to control the angular position of the fork, the actuation module 20 incorporates a position sensor 25. The actuation housing 21 supports the sensor 25 for sensing the position of the actuation fork and the detection face 25a of the position sensor is positioned facing one of the two actuation arms 52.

Figure 2:
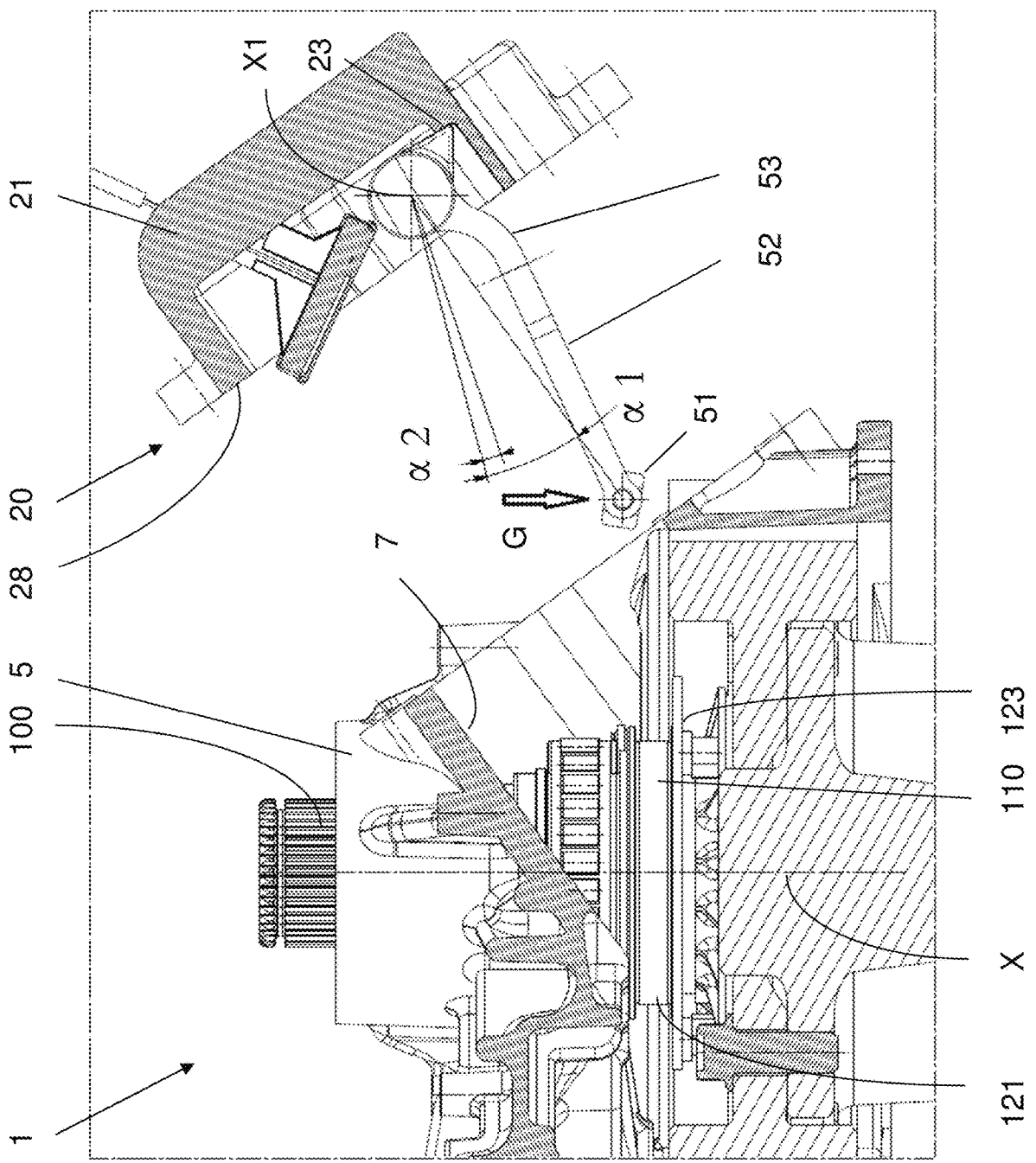
FIG. 2 is a cross-sectional view showing the assembly of the actuation module according to the first embodiment in FIG. 1 on a transmission system.
Figure 3:
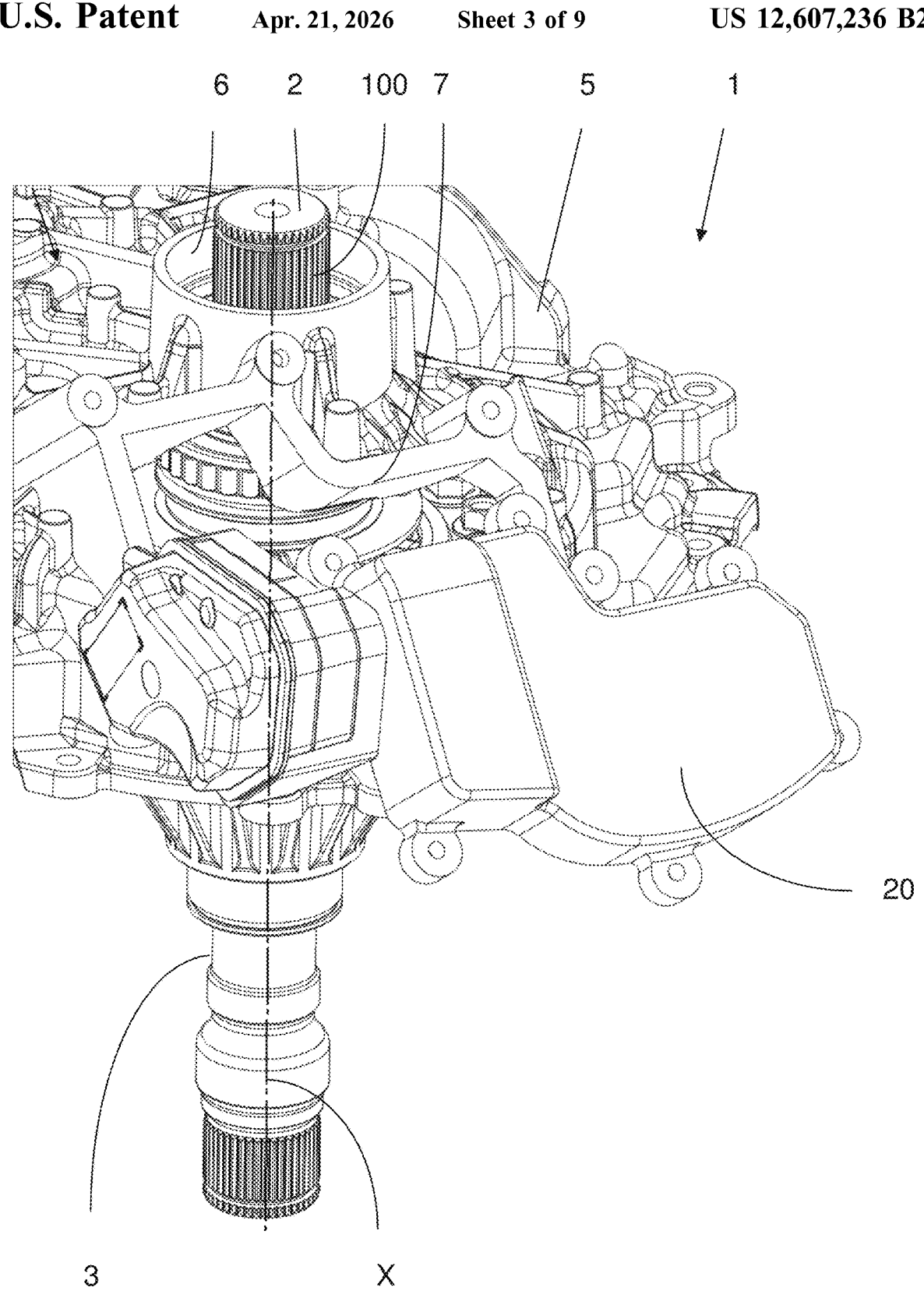
FIG. 3 is a perspective view showing the assembly of the actuation module according to the first embodiment in FIG. 1 on a transmission system.

FIG. 2 illustrates the phase of assembly of the actuation module 20 on the transmission system. The actuation module is attached to the outside of the transmission housing 5 and the actuation end 51 of the actuation fork is protruding relative to the actuation housing 21. The two actuation arms 52 that extend beyond the actuation housing 21 may be introduced into an opening 7 of the transmission housing.

In this assembly phase, the actuation fork first adopts a mounting end angular position corresponding to one of the limits of the first angular sector α1.

The assembly method then comprises the following steps:

firstly, inserting the transmission shaft 100 into an orifice 6 of the transmission housing 5 until the transmission shaft abuts axially on the transmission housing along the direction of the main axis X of the orifice;

inserting the actuation fork 50 into the opening 7 of the transmission housing 5 and fitting an actuation end 51 of the actuation fork into the annular groove 121 of the disconnection device;

bringing the actuation device 30 towards the transmission housing in a direction perpendicular to the main axis X of the orifice 6 of the transmission housing until the actuation housing of the actuation module bears on the transmission housing;

fastening the module to the transmission housing with fastening screws.

In order to ensure the correct positioning of the actuation arms at the beginning of the assembly phase, the mounting end angular position of the actuation fork is obtained by mechanically abutting the actuation housing and a protrusion 35 formed on the actuation fork. The protrusion 35 of the actuation fork bears on a machined flat face 23 of the actuation housing. This position of bearing on the flat face 23 embodies one of the limits of the first angular sector α1.

In order to ensure that the actuation fork remains in the mounting end angular position, the action of gravity G is used by placing the protrusion on the correct side of the first axis of rotation X1. The weight of the actuation fork is such that the protrusion 35 continues to bear on the flat face 23. Gravity G facilitates the assembly of the actuation module since the differential would be positioned vertically in the transmission housing, and the axially-oriented second teeth 118b of the first coupling part 118 engage with the complementary teeth 119a of the second coupling part 119 under their own weight.

When the actuation device 30 is brought towards the transmission housing in a direction perpendicular to the main axis X, the actuation end 51 quickly comes to bear on the mating flange 123. The mating flange 123 then acts as a flat guiding surface for the actuation module until contact is achieved between the fastening base 28 of the actuation housing 21 and the transmission housing 5.

The protrusion 35 and the actuation arms 52 are angularly offset relative to the first axis of rotation. According to the first embodiment, the actuation arms 52 and the protrusion 35 are offset by an angle of 120° relative to the first axis of rotation.

During the step of bringing the actuation device towards the transmission housing in a direction perpendicular to the main axis X, the angular position of the fork changes until it adopts an operating angular position different from the mounting end angular position. The operating angular position is reached when the actuation housing 21 is bearing on the transmission housing 5 and is fastened with fastening screws as illustrated in FIG. 4.

The operating angular position varies in the second angular sector α2.

When the actuation fork is situated in the second angular sector α2, the protrusion 35 is no longer in contact with the actuation housing 21.

Figure 6:
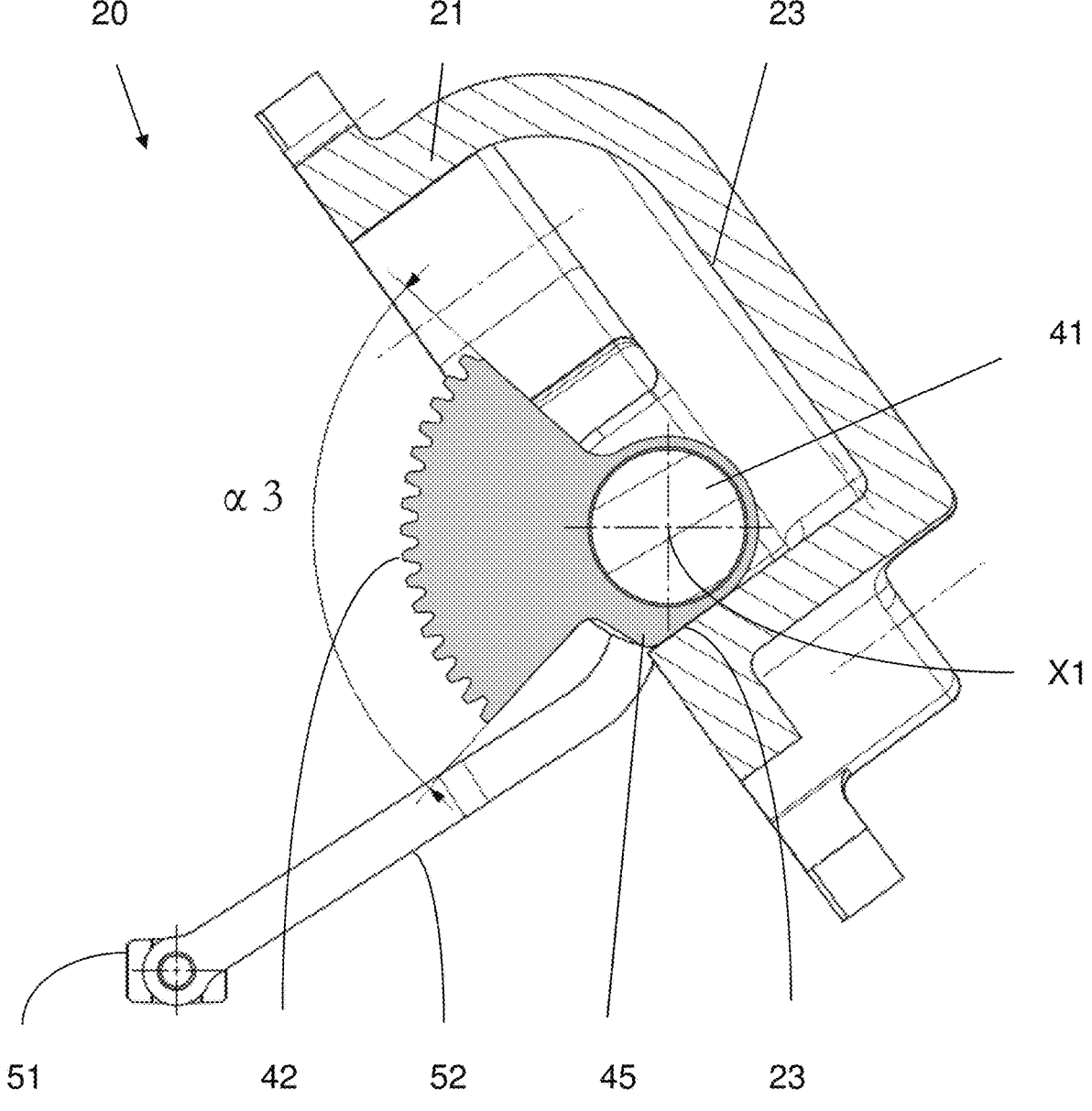
FIG. 6 is a cross-sectional view of an actuation module provided with its actuation device according to a second embodiment of the invention.

A second embodiment of the invention, which differs from the preceding embodiment by means of a different arrangement of the mechanical abutment between the actuation housing 21 and a component of the actuation device 30, will now be described with reference to FIG. 6.

In this second embodiment of the invention, the mounting end angular position of the actuation fork is obtained by mechanically abutting the actuation housing 21 and a protrusion 45 formed on one of the pinion or toothed sector of the speed reduction device.

The pinion 41 and the toothed sector 42 mesh with each other to reduce the rotation speed of the electric motor.

In this example, the toothed sector 42 that supports the protrusion 45 comprises teeth extending over a third angular sector α3 of between 20° and 150°. The protrusion 45 of the toothed sector 42 bears on a flat face 23 of the actuation housing 21.

Figure 7:
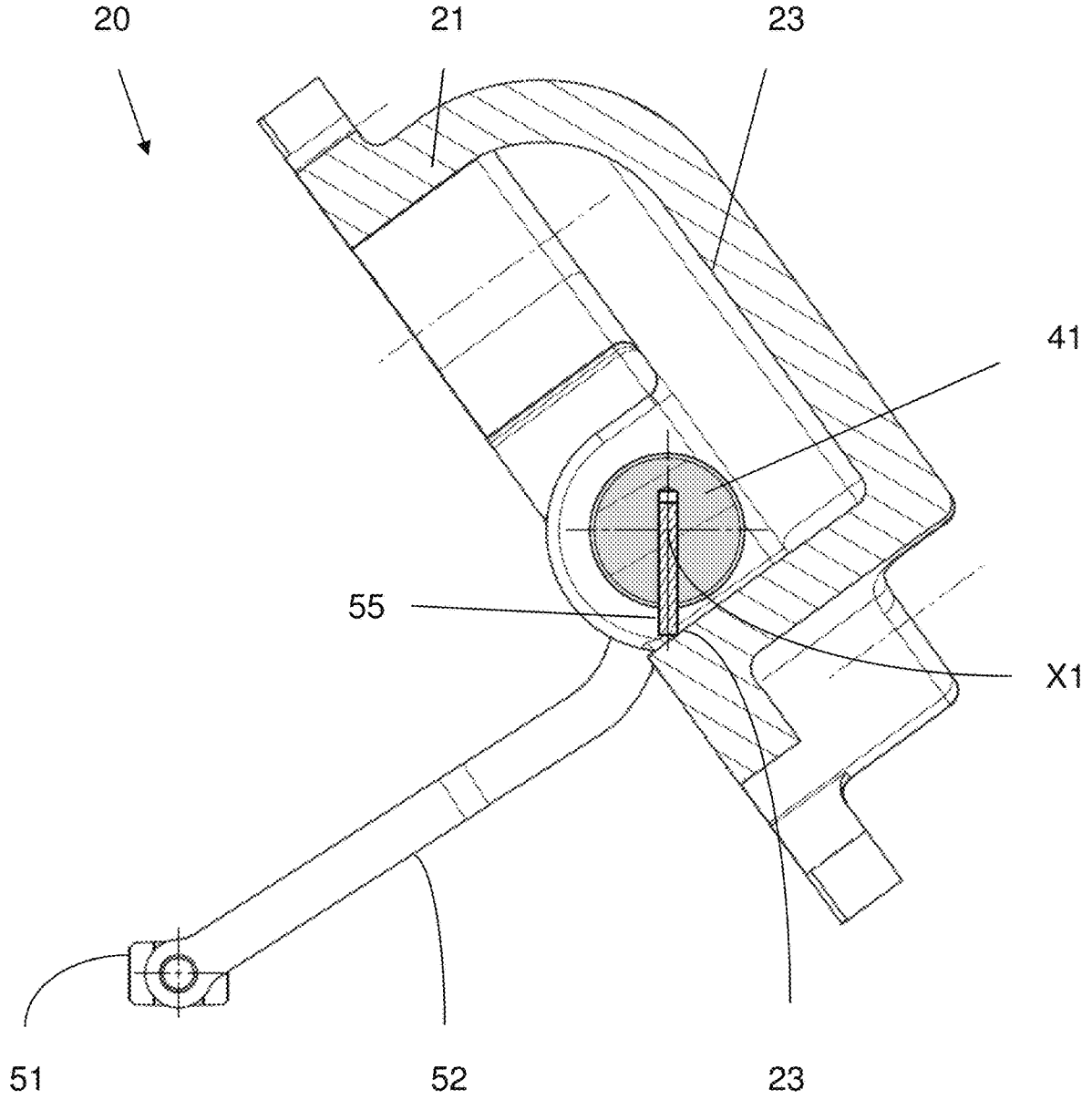
FIG. 7 is a cross-sectional view of an actuation module provided with its actuation device according to a third embodiment of the invention.

A third embodiment of the invention, which differs from the preceding embodiment by means of a different arrangement of the mechanical abutment between the actuation housing 21 and a component of the actuation device 30, will now be described with reference to FIG. 7.

In this third embodiment of the invention, the mounting end angular position of the actuation fork is obtained by mechanically abutting the actuation housing 21 and a pin 55 fitted into the output shaft 41 of the speed reduction device 40.

The pin 55 is fitted perpendicular to the first axis of rotation X1.

Advantageously, the fitted pin 55 bears on a flat face 23 of the actuation housing 21.

A fourth embodiment of the invention, which differs from the preceding embodiment in that the actuation device according to the invention is assembled directly on the transmission housing 5, will now be described with reference to FIG. 8. In this fourth embodiment of the invention, there is no need to provide an actuation module as the transmission housing replaces the actuation housing.

Figure 8:
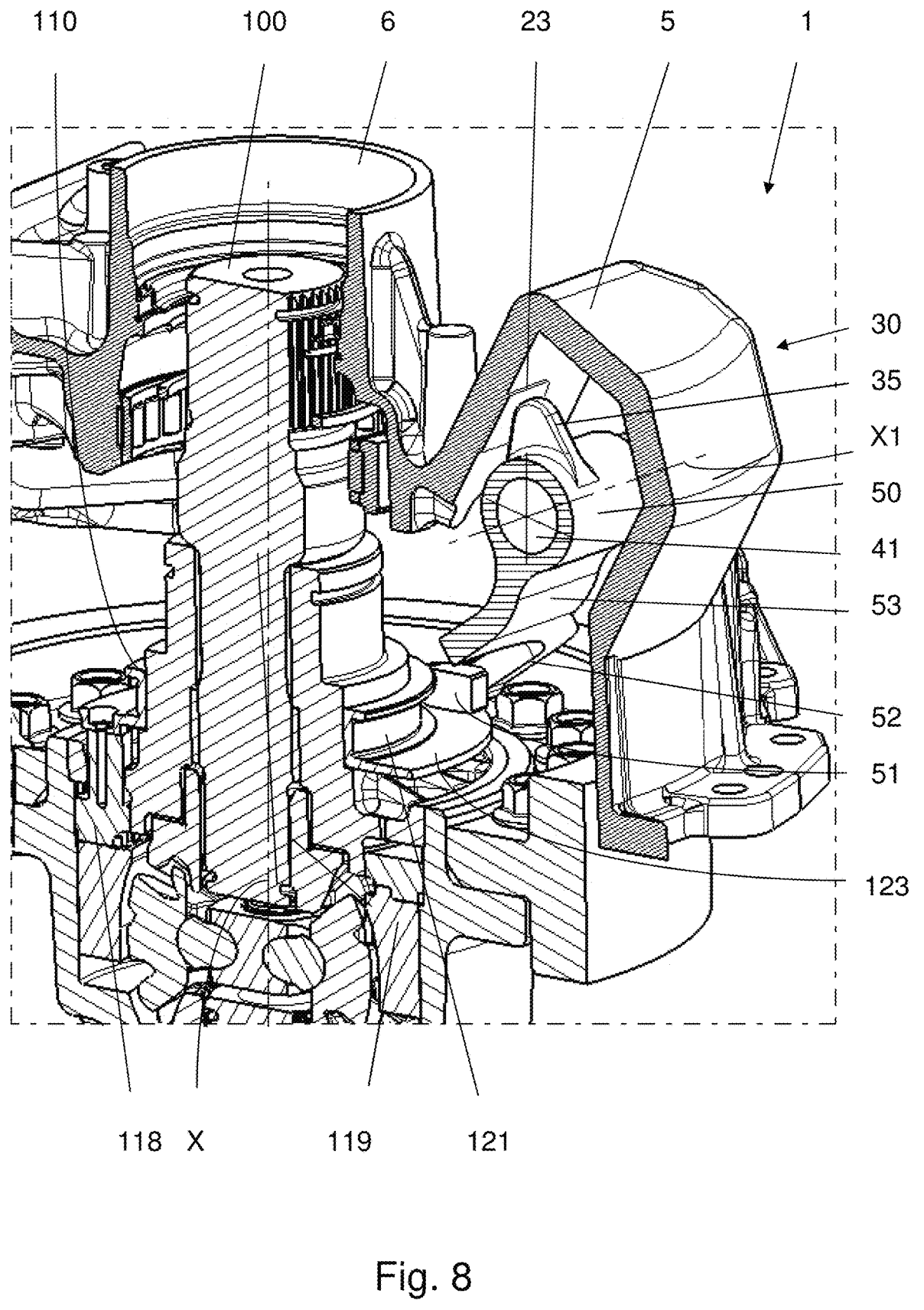

As illustrated in FIG. 8, the transmission system 1 comprises:

a transmission housing 5;

a transmission shaft 100 comprising a device 110 for disconnecting the transmission of torque, the transmission shaft 100 being inserted into an orifice 6 of the transmission housing 5;

an actuation device 30, wherein the actuation fork 50 is housed in the transmission housing and the actuation fork is inserted into an annular groove of the disconnection device;

the transmission housing 5 serves as the actuation housing, the transmission housing 5 and the actuation device 30 are pre-mounted so as to form a unitary assembly.

The actuation device 30 comprises:

an electric motor fastened to the transmission housing 5;

a speed reduction device kinematically linked to the rotor of the electric motor and an output shaft 41 of the speed reduction device having a first axis of rotation X1;

an actuation fork 50 rigidly connected to the output shaft 41 of the speed reduction device for rotation therewith and comprising an actuation end 51 that is radially offset relative to the first axis of rotation X1, the actuation fork being capable of pivoting through a first angular sector α1 in the actuation housing 21.

The angle value of the first angular sector α1 is between 5° and 120°.

This first angular sector α1 allows the actuation fork 50 to adopt all of the positions necessary, from the phase of assembly of the transmission shaft 100 on the transmission housing to the operating phases in which the disconnection device 110 is in the coupled position or the uncoupled position.

The actuation fork 50 comprises a body 53 and two actuation arms 52 supporting the actuation end 51, the two actuation arms 52 being integrally formed with the body of the fork. The body 53 and the two actuation arms 52 are housed in the transmission housing 5.

In this fourth embodiment, the actuation end 51 is a pad articulated on the end of the actuation arm 52.

In order to allow the axial movement of the first coupling part 118 of the disconnection device 110, the actuation fork 50 moves angularly through a second angular sector α2.

The angle value of the second angular sector α2 is between 1° and 30°. The second angular sector is in particular contained in the first angular sector α1.

FIG. 8 more specifically illustrates the phase of assembly of the transmission shaft 100 on the transmission system. In this assembly phase, the actuation fork first adopts a mounting end angular position corresponding to one of the limits of the first angular sector α1.

The assembly method then comprises the following steps:
firstly, inserting the transmission shaft 100 into an orifice 6 of the transmission housing 5;
blindly fitting an actuation end 51 of the actuation fork into the annular groove of the disconnection device;
moving the transmission shaft 100 along the direction of the main axis X of the orifice until the transmission shaft abuts axially on the transmission housing.

In order to ensure the correct positioning of the actuation arms 52 at the beginning of the assembly phase, the mounting end angular position of the actuation fork is obtained by mechanically abutting the actuation housing and a protrusion 35 formed on the actuation fork. The protrusion 35 and the actuation arms 52 are angularly offset relative to the first axis of rotation.

Figure 9:
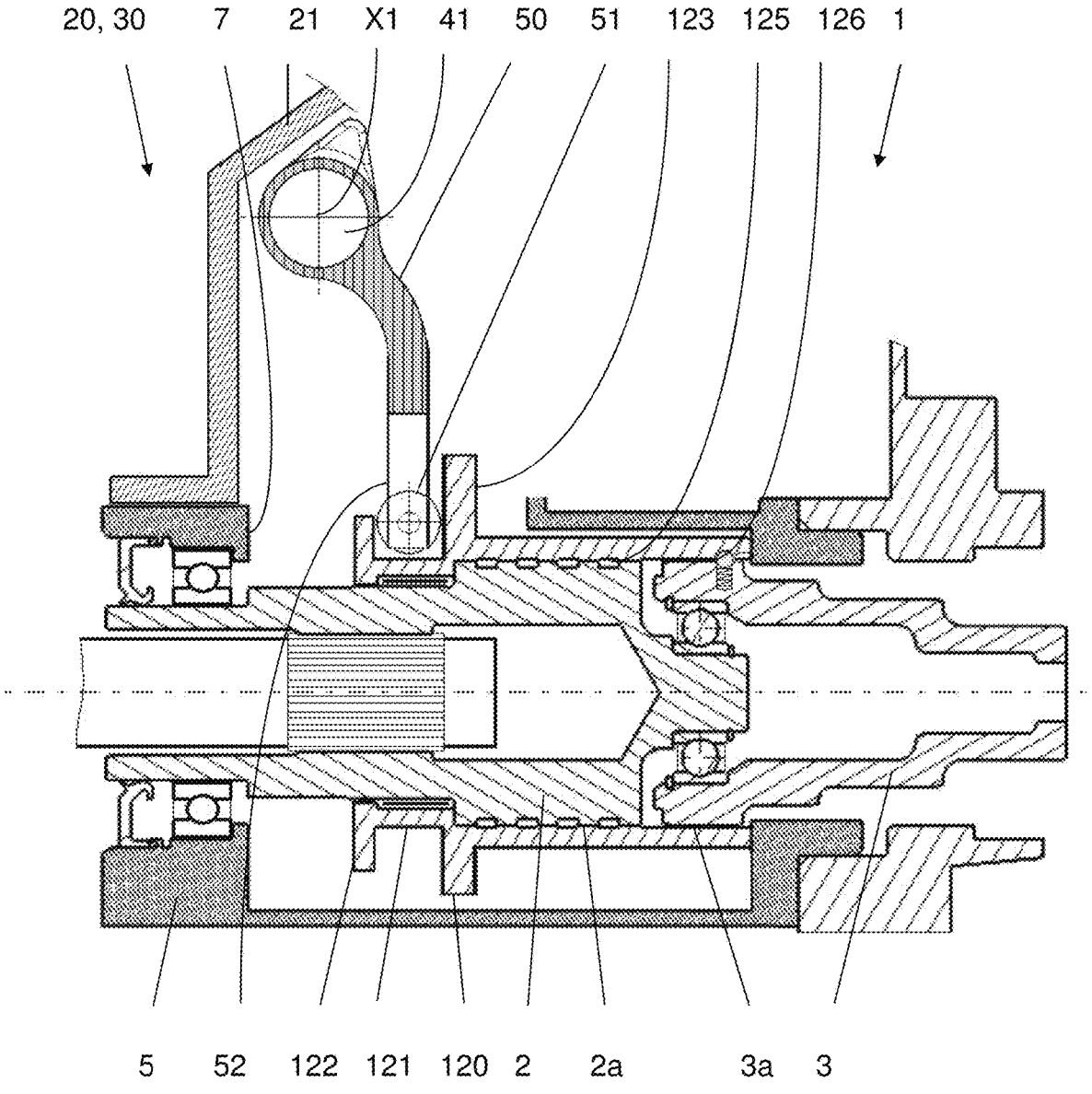
FIG. 9 is a cross-sectional view showing a transmission system and an actuation device according to a fifth embodiment of the invention.

A fifth embodiment of the invention, which differs from the first embodiment in that the disconnection device 110 is situated outside the differential 100 of the speed reducer, will now be described with reference to FIG. 9.

In this example, the transmission system 1 comprises:
a transmission housing 5;
a drive transmission shaft 2 comprising a first external spline 2a, the drive transmission shaft being inserted into an orifice of the transmission housing;
a driven transmission shaft 3 coaxial with the drive shaft, comprising a second external spline 3a;
an axial sliding sleeve 120 concentric with the driven and drive shafts having a shape exhibiting symmetry of revolution, the axial sliding sleeve comprising at least a first internal connecting spline 125 arranged to rotate the drive shaft 2 and a second internal connecting spline 126 arranged to rotate the driven shaft, the first and second internal splines 125, 126 being engaged respectively in the first external spline 2a of the drive shaft and the second external spline 3a of the driven shaft when the axial sliding sleeve 120 is in a coupled end position;
an actuation module 20, wherein the actuation fork 50 passes through an opening 7 made in the transmission housing 5 and the actuation fork 50 is inserted into an annular groove 121 of the axial sliding sleeve 120.

In this fifth embodiment, the actuation module 20 comprises an actuation housing 21 and an actuation device 30 comprising:
an electric motor fastened to the actuation housing 21;
a speed reduction device kinematically linked to the rotor of the electric motor and an output shaft 41 of the speed reduction device having a first axis of rotation X1;
an actuation fork 50 rigidly connected to the output shaft 41 of the speed reduction device for rotation therewith and comprising an actuation end 51 that is radially offset relative to the first axis of rotation X1.

In this actuation module 20, the actuation housing 21 and the actuation device 30 are pre-mounted so as to form a unitary assembly, and the actuation end 51 of the actuation fork is protruding relative to the actuation housing 21.

In this fifth embodiment, the actuation end 51 is a ball bearing the non-rotating ring of which is fastened to the actuation arm 52.

In this example, the axial sliding sleeve 120 serves as the interface between the actuation fork 50 and the disconnection device 110. The axial sliding sleeve 120 has a shape exhibiting symmetry of revolution and comprises a bearing flange 122 and a mating flange 123. The bearing flange 122 and the mating flange 123 surround the annular groove 121. The external diameter of the mating flange 123 is greater than the external diameter of the bearing flange 122.

The present invention is not limited to the means and configurations described and illustrated here, however, and also extends to all equivalent means and configurations and to any technically operational combination of such means.

The invention claimed is:

1. An actuation device for a transmission system, comprising:
an electric motor capable of being fastened to an actuation housing;
a speed reduction device kinematically linked to the rotor of the electric motor and an output shaft of the speed reduction device having a first axis of rotation;
an actuation fork rigidly connected to the output shaft of the speed reduction device for rotation therewith and comprising an actuation end that is radially offset relative to the first axis of rotation, the actuation fork being capable of pivoting through a first angular sector in the actuation housing,
wherein:
the actuation fork is capable of adopting a mounting end angular position corresponding to one of the limits of the first angular sector and in that the actuation fork is capable of adopting an operating angular position different from the mounting end angular position, the operating angular position being variable in a second angular sector contained in the first angular sector, and
the mounting end angular position of the actuation fork is capable of being obtained by mechanically abutting the actuation housing and a component selected from the actuation fork, the speed reduction device and the output shaft.

2. The actuation device according to claim 1, wherein the mounting end angular position of the actuation fork is capable of being obtained by mechanically abutting the actuation housing and a protrusion formed on the actuation fork.

3. The actuation device according to claim 2, wherein the actuation fork comprises a body and at least one actuation arm supporting the actuation end, the protrusion and the at least one actuation arm being angularly offset relative to the first axis of rotation.

4. The actuation device according to claim 3, wherein the protrusion of the actuation fork is capable of bearing on a flat face of the actuation housing.

5. The actuation device according to claim 1, wherein the mounting end angular position of the actuation fork is capable of being obtained by mechanically abutting the actuation housing and a protrusion formed on one of the pinion or toothed sector of the speed reduction device.

6. An actuation module comprising an actuation housing and an actuation device according to claim 1, wherein the actuation housing and the actuation device are pre-mounted so as to form a unitary assembly, and wherein the actuation end of the actuation fork is protruding relative to the actuation housing.

7. The actuation module according to claim 6, wherein the actuation housing supports a sensor for sensing the position of the actuation fork, the detection face of the position sensor being positioned facing at least one actuation arm of the actuation fork.

8. The actuation module according to claim 6, wherein the electric motor is attached to an external wall of the actuation housing or housed in the internal volume of the actuation housing.

9. A transmission system for a motor vehicle, comprising:

a transmission housing;

a transmission shaft comprising a device for disconnecting the transmission of torque, the transmission shaft being inserted into an orifice of the transmission housing;

an actuation module according to claim 6, wherein the actuation fork passes through an opening made in the transmission housing and the actuation end is inserted into an annular groove of the disconnection device.

10. The transmission system according to claim 9, wherein the transmission shaft is a differential comprising a differential casing supporting a toothed wheel and a supporting ring, the casing and the supporting ring being rotatable relative to each other about a main axis, the casing being intended to be driven by a rotary electric machine and the supporting ring being intended to drive at least one half-shaft of the motor vehicle.

11. A method for assembling a transmission system according to claim 9, comprising the following steps:

inserting the transmission shaft into an orifice of the transmission housing until the transmission shaft abuts axially on the transmission housing along the direction of the main axis of the orifice;

inserting the actuation fork into the opening of the transmission housing and fitting an actuation end of the actuation fork into the annular groove of the disconnection device;

bringing the actuation device towards the transmission housing in a direction perpendicular to the main axis of the orifice of the transmission housing until the actuation housing of the actuation module bears on the transmission housing;

fastening the actuation module to the transmission housing with fastening screws.

12. The transmission system according to claim 10, wherein the disconnection device comprises a first coupling part rigidly connected to the casing for rotation therewith and a second coupling part rigidly connected to the supporting ring for rotation therewith, the first coupling part being axially movable relative to the casing between a coupled position in which the first coupling part is coupled to the supporting ring so as to transmit torque between the casing and the supporting ring, and an uncoupled position in which the first coupling part and the second coupling part are uncoupled from each other, and wherein the first coupling part supports an annular axial sliding sleeve that comprises the annular groove of the disconnection device.

13. The transmission system according to claim 12, wherein the axial sliding sleeve has a shape exhibiting symmetry of revolution and comprises a bearing flange and a mating flange, said bearing flange and said mating flange surround the annular groove, and the external diameter of the mating flange is greater than the external diameter of the bearing flange.

14. A transmission system comprising:

a transmission housing;

a transmission shaft comprising a device for disconnecting the transmission of torque, the transmission shaft being inserted into an orifice of the transmission housing;

an actuation device according to claim 1, wherein the actuation fork is housed in the transmission housing and the actuation fork is inserted into an annular groove of the disconnection device, wherein:

the transmission housing serves as the actuation housing, and the transmission housing and the actuation device are pre-mounted so as to form a unitary assembly.

15. An actuation module for a transmission system, comprising:

an actuation housing; and an actuation device including:

an electric motor capable of being fastened to the actuation housing, a speed reduction device kinematically linked to the rotor of the electric motor and an output shaft of the speed reduction device having a first axis of rotation, and an actuation fork rigidly connected to the output shaft of the speed reduction device for rotation therewith and comprising an actuation end that is radially offset relative to the first axis of rotation, the actuation fork being capable of pivoting through a first angular sector in the actuation housing, wherein:

the actuation fork is capable of adopting a mounting end angular position corresponding to one of the limits of the first angular sector and in that the actuation fork is capable of adopting an operating angular position different from the mounting end angular position, the operating angular position being variable in a second angular sector contained in the first angular sector, the actuation housing and the actuation device are pre-mounted so as to form a unitary assembly, and the actuation end of the actuation fork is protruding relative to the actuation housing.

16. The actuation module according to claim 15, wherein the mounting end angular position of the actuation fork is capable of being obtained by mechanically abutting the actuation housing and a component selected from the actuation fork, the speed reduction device and the output shaft.

17. The actuation module according to claim 15, wherein the mounting end angular position of the actuation fork is capable of being obtained by mechanically abutting the actuation housing and a protrusion formed on the actuation fork.

18. The actuation module according to claim 17, wherein the actuation fork comprises a body and at least one actuation arm supporting the actuation end, the protrusion and the at least one actuation arm being angularly offset relative to the first axis of rotation.

19. The actuation module according to claim 18, wherein the protrusion of the actuation fork is capable of bearing on a flat face of the actuation housing.

20. The actuation module according to claim 15, wherein the mounting end angular position of the actuation fork is capable of being obtained by mechanically abutting the actuation housing and a protrusion formed on one of the pinion or toothed sector of the speed reduction device.

21. The actuation module according to claim 15, wherein the actuation housing supports a sensor for sensing the position of the actuation fork, the detection face of the position sensor being positioned facing at least one actuation arm of the actuation fork.

22. The actuation module according to claim 15, wherein the electric motor is attached to an external wall of the actuation housing or housed in the internal volume of the actuation housing.

23. A transmission system for a motor vehicle, comprising:

a transmission housing;

a transmission shaft comprising a device for disconnecting the transmission of torque, the transmission shaft being inserted into an orifice of the transmission housing;

an actuation module according to claim 15, wherein the actuation fork passes through an opening made in the transmission housing and the actuation end is inserted into an annular groove of the disconnection device.

24. The transmission system according to claim 23, wherein the transmission shaft is a differential comprising a differential casing supporting a toothed wheel and a supporting ring, the casing and the supporting ring being rotatable relative to each other about a main axis, the casing being intended to be driven by a rotary electric machine and the supporting ring being intended to drive at least one half-shaft of the motor vehicle.

25. The transmission system according to claim 24, wherein the disconnection device comprises a first coupling part rigidly connected to the casing for rotation therewith and a second coupling part rigidly connected to the supporting ring for rotation therewith, the first coupling part being axially movable relative to the casing between a coupled position in which the first coupling part is coupled to the supporting ring so as to transmit torque between the casing and the supporting ring, and an uncoupled position in which the first coupling part and the second coupling part are uncoupled from each other, and wherein the first coupling part supports an annular axial sliding sleeve that comprises the annular groove of the disconnection device.

26. The transmission system according to claim 25, wherein the axial sliding sleeve has a shape exhibiting symmetry of revolution and comprises a bearing flange and a mating flange, said bearing flange and said mating flange surround the annular groove, and the external diameter of the mating flange is greater than the external diameter of the bearing flange.

* * * * *